US007835997B2

(12) United States Patent  
Rajkhowa et al.

(10) Patent No.: US 7,835,997 B2  
(45) Date of Patent: Nov. 16, 2010

(54) SYSTEM FOR THERAPY

(76) Inventors: Sudhir Rajkhowa, 46 Eugenia Street, Barrie, Ontario (CA) L4M 1P8; Nathan Kumar Rajkhowa, 148 Thrushwood Drive, Barrie, Ontario (CA) L4N 0Z1

(*) Notice: Subject to any disclaimer, the term of this patent is extended or adjusted under 35 U.S.C. 154(b) by 414 days.

(21) Appl. No.: 11/785,935

(22) Filed: Apr. 23, 2007

(65) Prior Publication Data

US 2008/0262982 A1 Oct. 23, 2008

(51) Int. Cl.  
*G06N 5/00* (2006.01)

(52) U.S. Cl. ............................................. 706/1; 706/45
(58) Field of Classification Search .................. 706/1, 706/45; 709/204
See application file for complete search history.

(56) References Cited

U.S. PATENT DOCUMENTS

| 6,487,583 | B1 * | 11/2002 | Harvey et al. ............ 709/204 |
| 6,519,571 | B1 * | 2/2003 | Guheen et al. ............ 705/14 |
| 6,519,629 | B2 * | 2/2003 | Harvey et al. ............ 709/204 |

OTHER PUBLICATIONS

Heller et al, Freudbot: An Investigation of Chatbot Technology in Distance Education, Ed-Media Proceedings, 2005, pp. 1-6.*

* cited by examiner

*Primary Examiner*—Wilbert L Starks, Jr.  
(74) *Attorney, Agent, or Firm*—Elias Bolges

(57) ABSTRACT

The invention is a system for remotely conducting psychotherapy between a client having and a therapist over the internet. The system includes a first web enabled computer device operated by the client, said first computer device having a web browser and being operatively coupled to the Internet. The system further includes a second web enabled computer device operated by the therapist, said second computer device having a web browser and being operatively coupled to the Internet. The system also includes a server operatively coupled to the Internet and a web server application resident on the server and a web site resident on the server. The web server application is operatively coupled to a private web based chat application, said chat application being activated by the client by engaging a first link on the web site. The private chat application is adapted and configured to relay live text, audio and video messages between the client and therapist via the web browsers of the first and second computer devices. The web server application and the private chat applications are adapted and configured to permit the client to interact anonymously with the therapist via the chat application.

5 Claims, 8 Drawing Sheets

SYSTEM FOR THERAPY

FIELD OF THE INVENTION

The invention relates generally to systems for conducting psychological and psychiatric therapy sessions through the world wide web.

BACKGROUND OF THE INVENTION

Psychological and psychiatric counseling has traditionally occurred in a practitioner's office. The patient generally schedules an appointment with the therapist and then attends at the therapist's office at the appointed time. The patient and practitioner then engage in the session, which generally involves the patient conveying information to the practitioner about the patients condition, including details of the patient's experiences, feelings, history and other deeply personal information. The practitioner may then counsel the patient depending on the nature of the information revealed to the practitioner by the patient. This counseling may take several forms; however, it often consists of conveying to the patient information which assists the patient in re-interpreting the experiences or feelings which the patient has experienced. The information conveyed by the practitioner may also assist the patient in dealing with stress or psychological pressure or may otherwise assist or comfort the patient.

The effectiveness of the therapy is dependent on many factors, including the amount and quality of the information conveyed by the patient to the practitioner. It is important that the information conveyed to the practitioner be as accurate and complete as possible, in order for the practitioner to accurately assess the patient's condition and assist in treatment. However, patients often have difficulty fully and accurately conveying this information. Much of the information conveyed to the practitioner from the patient is highly confidential and often very difficult for the patient to communicate due to the emotional significance the patient may attaches to the information. In many cases, the information being revealed by the patient is highly prejudicial to the patient, and the patient may be reluctant to reveal it. Therefore, patients often require that the information being conveyed remain secure and confidential. In many cases, despite the legal and other assurances given by the practitioner, the patient may still be reluctant to reveal the information because the patient feels or believes the information is too shameful to be revealed. In such cases, not only is confidentiality and security required, but the patient also feels the need for anonymity. Anonymity is very difficult to achieve in a therapy session because in order to schedule a session, the therapist's office must communicate with the patient and record several details about who the patient is. This is necessary to schedule the session, but also to ensure that the session is paid for. Therefore, patient's who cannot reveal certain information because the information is too personal for them to reveal, either do not seek counseling, or do not fully disclose all that needs to be disclosed during a session. An improved system of counseling is required which permits the patient and practitioner to freely and fully exchange information with one another while maintaining the secrecy and anonymity of the patient.

SUMMARY OF THE INVENTION

The present invention overcomes the drawbacks of the prior art by providing a secure system wherein patients (clients) may obtain psychological therapy in a safe, secure and anonymous manner. The invention is a system for remotely conducting psychotherapy between a client having and a therapist over the internet. The system includes a first web enabled computer device operated by the client, said first computer device having a web browser and being operatively coupled to the Internet. The system further includes a second web enabled computer device operated by the therapist, said second computer device having a web browser and being operatively coupled to the Internet. The system also includes a server operatively coupled to the Internet and a web server application resident on the server and a web site resident on the server. The web server application is operatively coupled to a private web based chat application, said chat application being activated by the client by engaging a first link on the web site. The private chat application is adapted and configured to relay live text, audio and video messages between the client and therapist via the web browsers of the first and second computer devices. The web server application and the private chat applications are adapted and configured to permit the client to interact anonymously with the therapist via the chat application.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
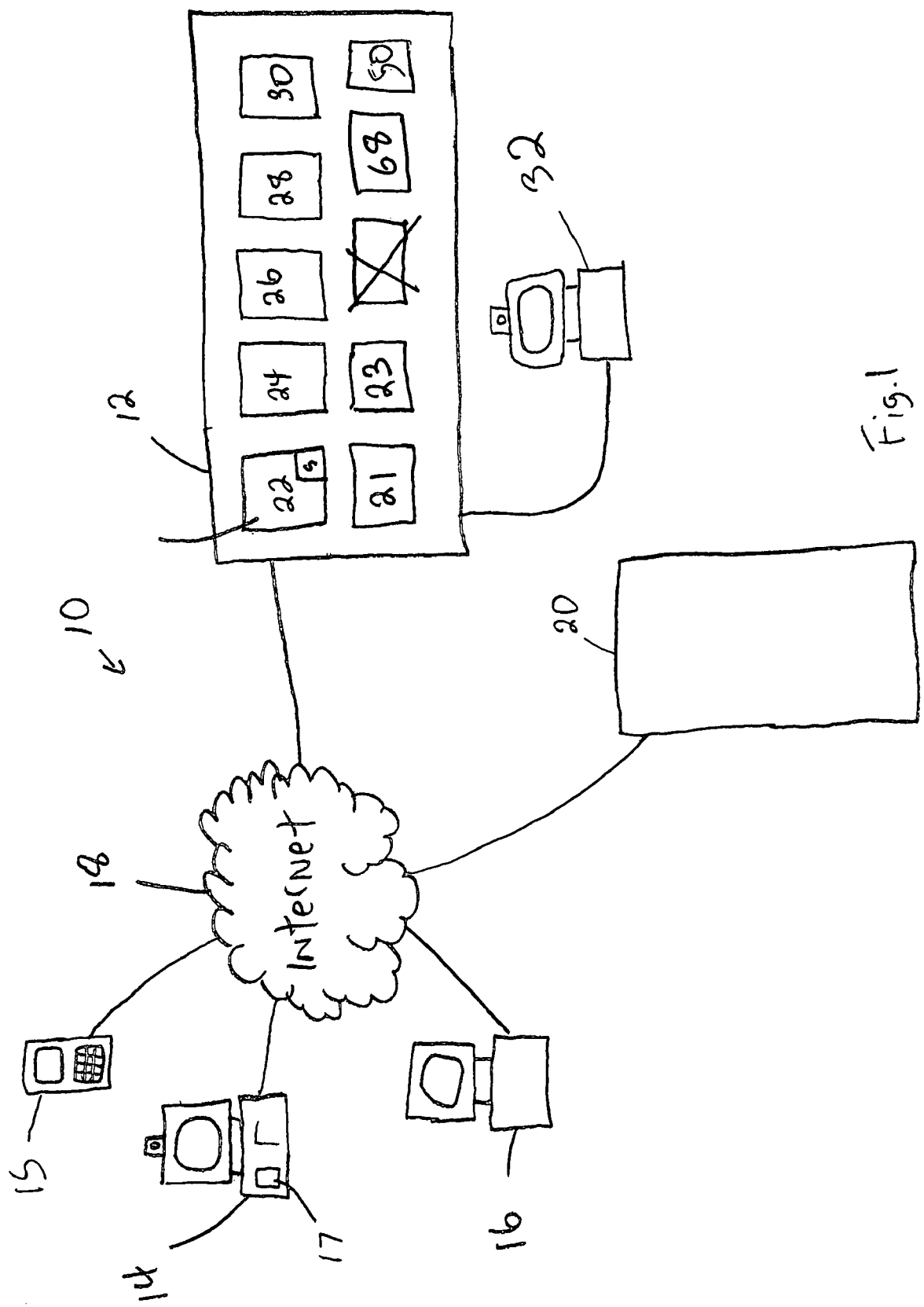
FIG. 1 is a schematic view of the system of the present invention.

Referring firstly to FIG. 1, a system for therapy according to the present invention is shown generally as item 10 and consists of server 12 which is operatively coupled to the internet (world wide web) 18 and therefore to remote computing devices 14, 15 and 16. Remote computing devices 14, 15 and 16 may be any web enabled computer device such as a laptop computer, a desktop computer, a hand held computer, a Blackberry™ device or even a cell phone, provided the device is web enabled and has a web browsing application 17. Numerous such devices are readily available on the market-place. Any modern web browser application such as Internet Explorer™, Safari™, Opera™, or Firefox™ running on any suitable operating system such as Windows™, Linux™, OSX™, BSD™, Solaris™, Unix™ or the like may be used to access the system.

Server 12 is loaded with a web application 21 which is operatively coupled to an artificially intelligent application (or AI Bot) 22, an automated payment application 24, a Wikipedia like database 26, a forum application 28, a chat like web application 30 and a spider application (or spider bot). AI Bot 22 is operatively coupled to AI database 50. Web application 21 is operatively coupled to a web site, 23, which is stored on server 12. Web application 21 is operatively coupled to applications 22, 24, 26, 28 and 30 such that the web application shuttles information between computing devices 14, 15 and 16, web site 23 and applications 22, 24, 26, 28 and 30. Server 12 is operatively coupled to computer 32 and web application 21 is adapted and configured to shuffle information between computer 32 and computing devices 14, 15 and 16 using information from web site 23. Server 12 runs a highly stable and highly secure operating system, preferably Linux and applications 21, 22, 24, 26, 28 and 30 are of course configured to run securely on Linux. Web application 21 preferably consists of a Linux based open source web server application of the type readily available in the market, for example Apache™, Cherokee™, Hdra™, phpbb and has modifications and or system guards to stop myslq injection attacks and/or false user attacks. The application may also use encrypted software such as MDF blowfish and DES/RSA encryption using SHA2 (used to properly secure data as well as embedded applications such as the chat service), or the Onion network (defends against DDOS attacks).

Figure 2:
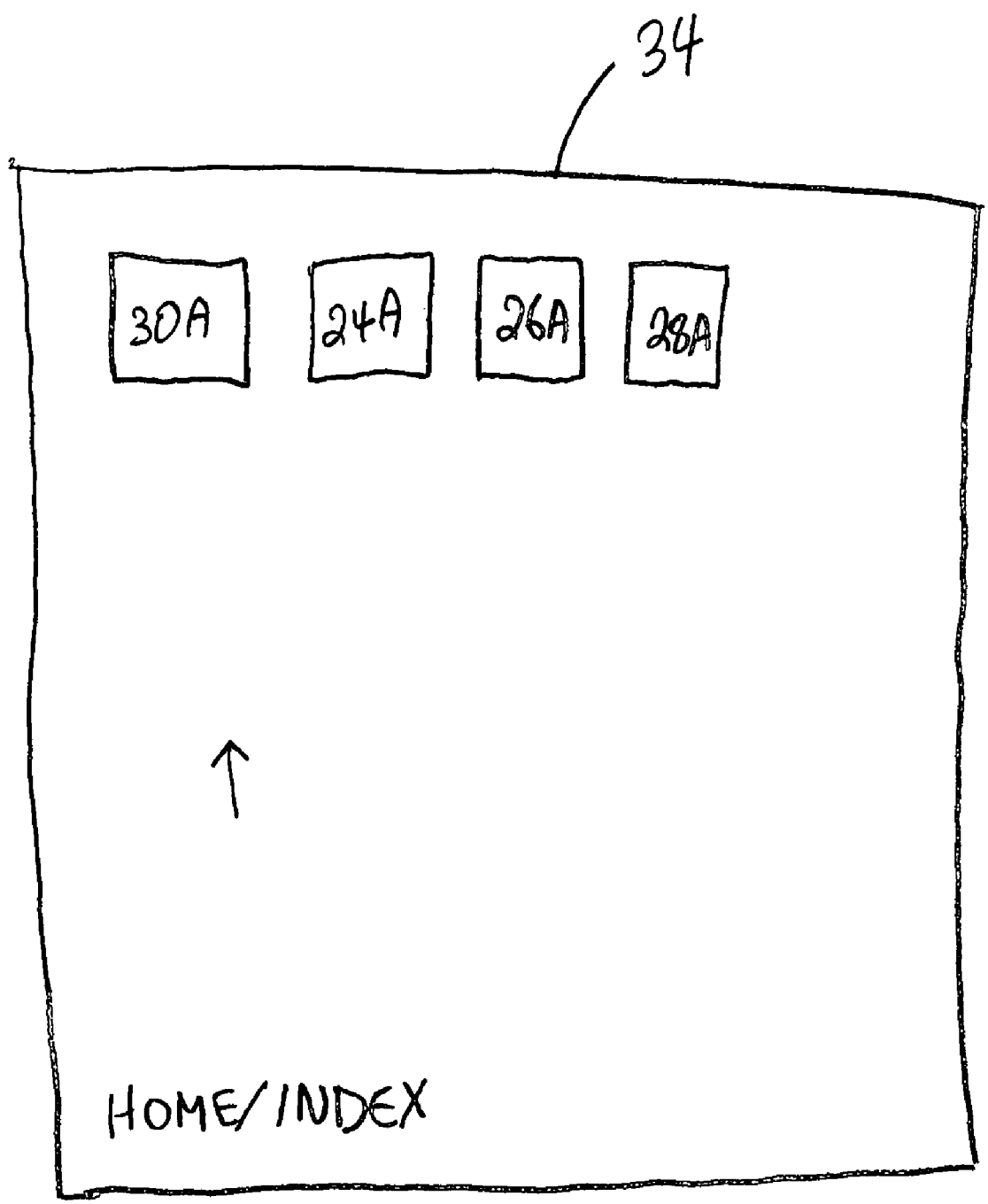
FIG. 2 is a schematic view of the index page of the web site component of the present invention.

As best seen in FIG. 2, web site 23 preferably takes the form of a web portal which, to any user operating devices 14, 15 and 16, appears to be a large and extensive web site divided into several separate sections with an index (home) page shown generally as item 34. Page 34 has links 30A, 24A, 26A and 28A corresponding to applications 30, 24, 26 and 28, respectively. The user activates the appropriate application by clicking onto the corresponding link.

Referring back to FIG. 1, chat application 30 is quite similar to a standard chat application such as MSN chat, Yahoo Chat, or the like, the principle difference being that chat application 30 is web based and does not require the user to download a separate chat application to his or her computer. Chatting via chat application 30 occurs using the remote computing device's web browser application. When a user on remote computing devices 14, 15 or 16 activates chat application 30, application 30 opens a line of communication between computer 32 and the remote computing device, much like a traditional chat program does, thereby enabling the user to chat with the person operating computer 32. Computer 32 may be operatively coupled to server 12 through an appropriate local area network (not shown) or it may be connected to server 12 via the Internet. Hence, the therapist or practitioner operating computer 32 may be located remote from both server 12 and the patient using remote computing devices 14, 15 or 16.

Figure 3:
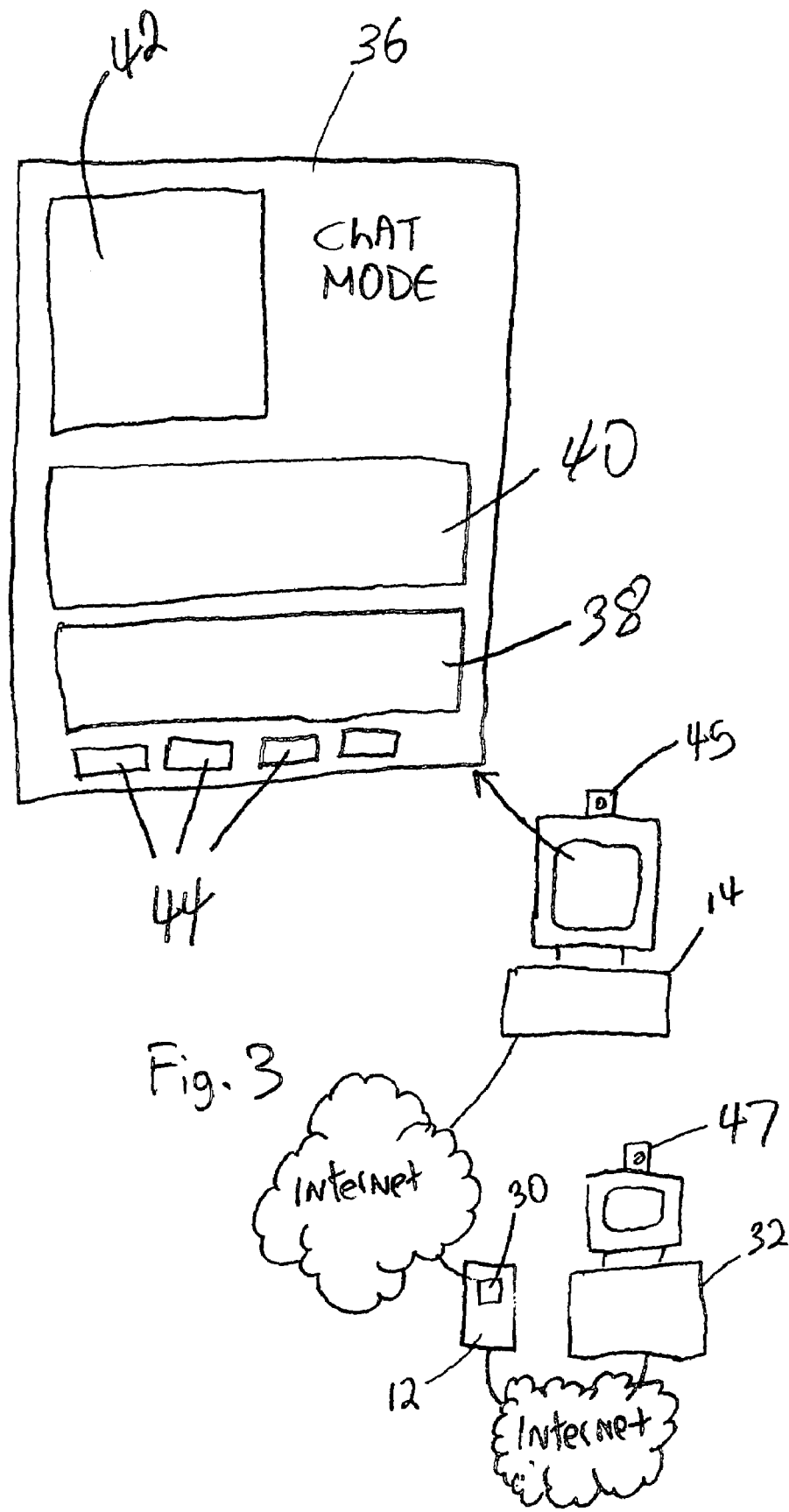
FIG. 3 is a schematic view of a patient conducting a remote therapy session with a practitioner using the system of the present invention.

As seen in FIG. 3, from the perspective of the user operating remote computing devices 14, 15 or 16, a web page 36 appears in the user's browser window. Web page 36 is adapted and configured much like a traditional chat program would, and includes write dialogue field 38 wherein the user can type a message, a read dialogue field, wherein the user can read the message sent from the person operating computer 32, a viewing field 42 wherein the user operating the remote computing device can see a live video or still image of the person operating computer 32, and buttons 44 wherein the user can adjust the fonts displayed in fields 38 and 40, use emoticons, control the volume and the like. The chat application also has the ability to broadcast live audio and video between computer 32 and remote computing device 14, much like a standard chat program, using web cam/microphone devices 45 and 47. Unlike a standard chat program; however, the chat sessions are not logged and cannot be recorded or saved on server 12 and/or computer 32, thereby providing the user with increased anonymity and security. Also, to provide the user with greater anonymity and privacy, chat application 30 is further adapted and configured so that the user may disable the video and audio features on his/her computer thereby permitting him to view and listen to the person operating computer 32 while not broadcasting any video or audio from remote computing device 14. Finally, chat application 30 includes an embedded encryption application to ensure that only the operator of computer 32 and the user of computing device 14 can read, see and hear the contents of the chat conversation taking place; hence, the user can feel fully protected and secure in the knowledge that the chat conversation is both secure and anonymous.

Preferably, the system incorporates a trained psychologist or psychiatrist as the operator of computer 32, thereby permitting the user of remote computing device 14, namely the patient, to engage in a live one-on-one therapy session with a trained professional. The anonymity, secrecy and security provided by the present system enables the patient to feel more comfortable about relaying emotionally sensitive or "shameful" information to the therapist, thereby increasing the potential effectiveness of the session. The live video and voice features of the chat session permits the patient to experience the session much like an in-person session; hence, the effectiveness of the session is not greatly reduced as a result of the session being carried out through a remote chat conversation as opposed to an in-person session.

Figure 4:
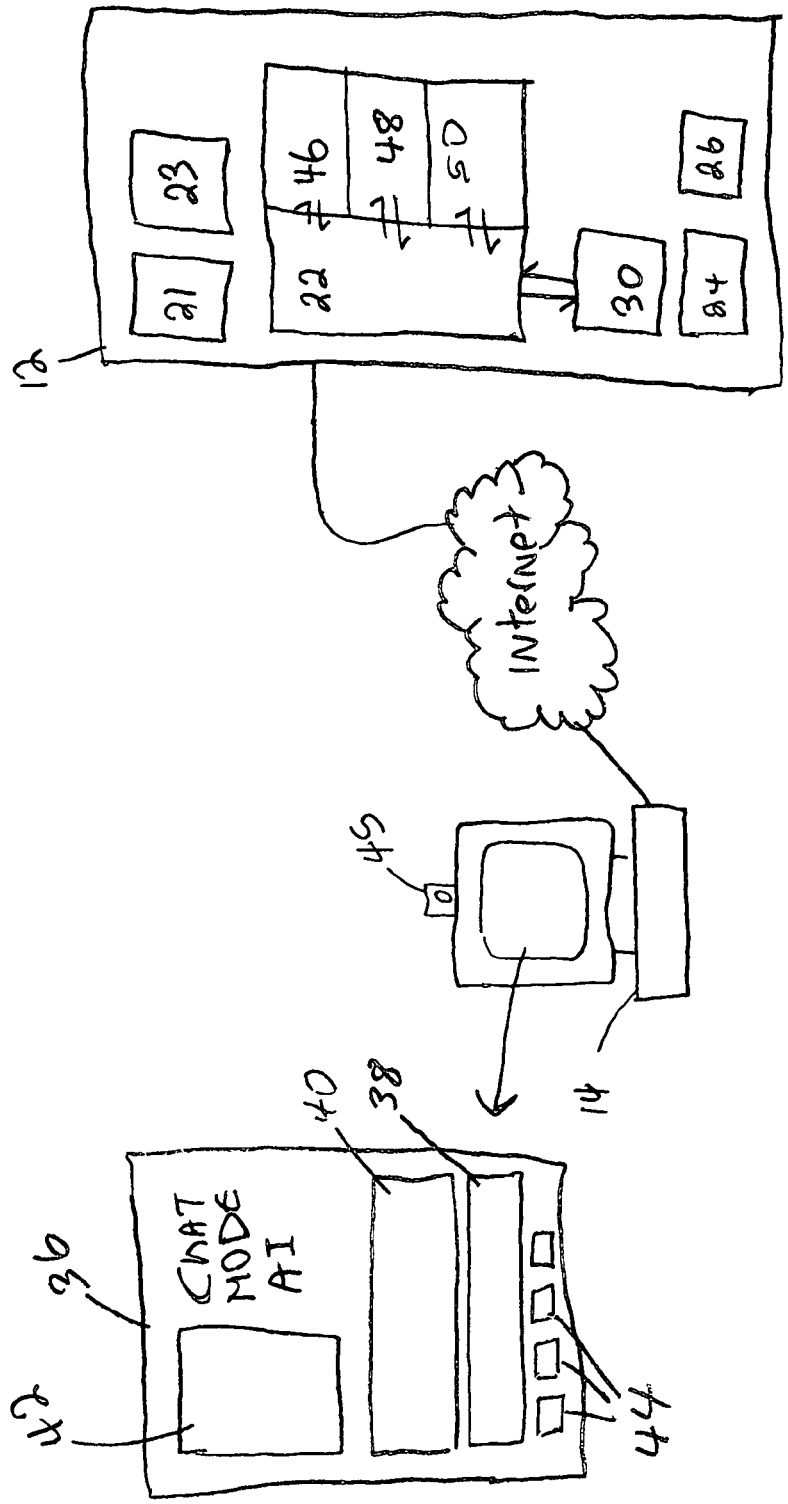
FIG. 4 is a schematic view of a patient conducting a remote therapy session with the artificially intelligent component of the system of the present invention.

Referring now to FIG. 4, in the event that a trained psychologist or psychiatrist is not available to participate in a live chat session with a patient, the system can still provide the user with a therapy session using the interactive chat application 30 with AI Bot 22 standing in place for the therapist. AI Bot 22 is adapted and configured to interact with chat application 30 such that the AI Bot can send and receive text and voice messages through the chat application to the user operating remote computing device 14. Artificial Intelligence Bot 22 is made up of a self-learning, input analysis process where by selected, words, phrases and meanings are compiled in a database 70 and then integrated into the AI Bot. The system is made up of a specialized file structure using the xml standard known as AIML Files or Artificial Intelligence Markup Language. With Combined knowledge of health care information, definitions and resources, the Bot is able to think and then respond in a therapeutic and human like manner to, not only provide answers to questions posed by the patient operating remote computing device 14, but to achieve a personal connection on an emotional level with the patient. To further this feature, AI Bot 22 has an integrated voice recognition and creation application 46 which is adapted and configured to receive and interpret voice messages from the patient and to respond in kind via a verbal response from the A.I. bot. AI Bot 22 also includes an integrated interactive animated facial structure application, which is adapted and configured to display a responsive face in viewing field 42 of the patient's computing device, thereby enabling a greater emotional connection between the patient and AI Bot 22. The software for A.I. Bot 22 uses Open Source Software that was originally created by Dr. Richard Walles using AIML and which is more particularly described in the following publications entitled *AIML Overview* (a copy of which can be obtained at http://www.pandorabots.com/pandora/pics/wallaceaimltutorial.html), *Artificial Intelligence Markup Language (AIML), Version* 1.0.1, *A.L.I.C.E. AI Foundation Working Draft,* 18 Feb. 2005 (rev 007) (a copy of which can be obtained at http://docs.aitools.org/aiml/spec/), the entirety of which are incorporated herein by reference. Further descriptions of how A.I. bots can be construced using AIML are discussed on Dr. Wallace's website at http://www.alicebot.org/documentation/, the entirety of which is incorporated herein by reference.

The A.I. Bot 22 is constructed using a special file type known as AIML (Artificial Intelligence markup language) which is a derivative of xml. Because of flexibility of xml, user commands and or specialized tags could be used to control the response of the A.I. Bot. Because of this, manipulation as well as the adding of any customized information could be done via file restructuring and specialized tag identification. Using multiple A.I. files would make up a vast selection of responses using a database system such as sql (database 50). This would then make the responses "human like" as the machine itself would listen to the user and just like a human, it would then "think," and come out with the best response it "feels" is appropriate. The customization of the A.I. is furthered when one controls the AIML files to insert special knowledge of the medical field including definitions and statistics along with the average response that was originally programmed plus modified behavioral patterns to make the bot seem to have a softer reciprocal expression. Using multiple sources as well as collective database solution the bot itself can then be automatically extended and maintained. The A.I. can learn via words written to the bot and when locating a response for a reaction to occur, it automatically adapts the action and/or question being asked to the database and thus when searching next time for the answer, it would then reciprocate with a different response. Reading the input of a user's text and then searching for a response, the bot categorizes the users text in a separate AIML file that lists such input. When the another user inputs similar data, then the new response will consist of not only the regular programmable expressions but may add information to its response from that file. While this occurs, a flash action script then reads the response that the bot has given, outputs with a voice mechanism, which is invoked much like a web cam or a mike on the user's system and in turn "speaks" on what the output of the bot has represented. While this section of the bot occurs, another action flash script automatically adapts the speech to the animation of the facial interface to make it more "human like." This part of the system also goes along with the ability to follow one's mouse curser by pinpointing the application device processing ID located on the user's system thus making it seem, like it knows where the pointing device is located. These extra options were added via an "off the shelf service" at http://www,oddcast.com and is hosted via http://www.pandorabots.com. The result of this special service application is an A.I. bot which provides therapy similar to the professional who trains it and as effectivity as the professional would have done. The AIML Files that make up the Bots thinking pattern and personality are stored as files 50. The AI Bot feature of the invention increases the confidential nature of the therapy session with the patient, enabling the patient an easy to approach environment withing which to obtain therapy. Furthermore, since AI Bot 22 may be made available 24 hours a day, the patient is permitted with the option of obtaining therapy in times of crisis situations, as well as permitting the patient to feel that the system is 'always on' and 'always available'. This "always on" and "always available" feature increases the confidence the patient can have in the system.

Figure 6:
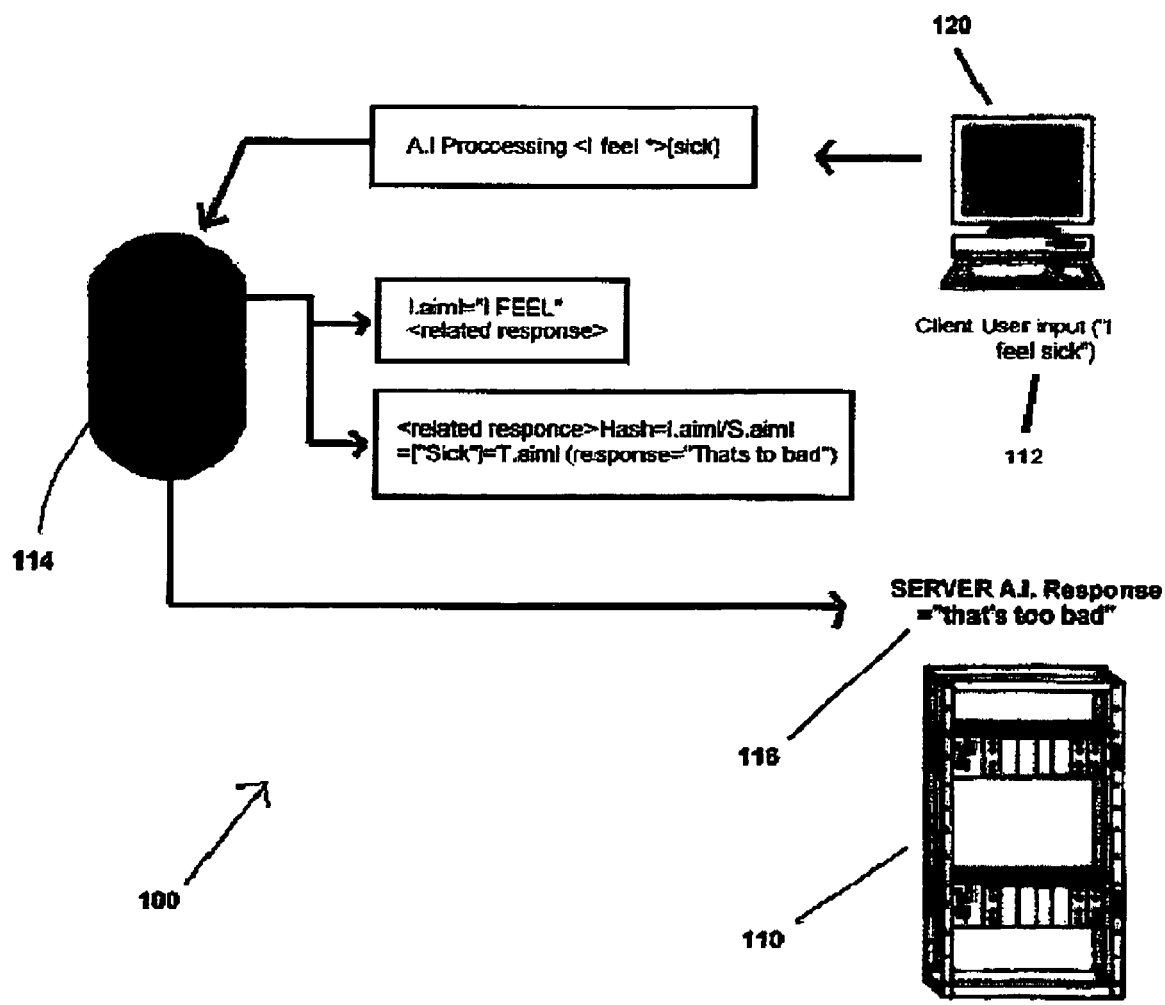
FIG. 6 is a schematic view of the process used by a standard A.I. bot which incorporates the AIML in answering queries from a person.

Referring now to FIG. 6., the operation of AIML based artificially intelligent programs will now be discussed. A system incorporating an AIML based AI application is illustrated generally as item 100 and is generally resident on a server 110 which is operatively coupled to a user computer 120. The user computer sends a message, 112 to the AI bot, in this case, the message reads "I feel sick". The AIML AI bot processes the message and identifies two portions of the message, namely "I feel" and "sick". The AIML AI bot then conducts a search of AIML database 114 for "I feel" and for "sick" and pulls out the matched response 116 "that's too bad".

Figure 7:
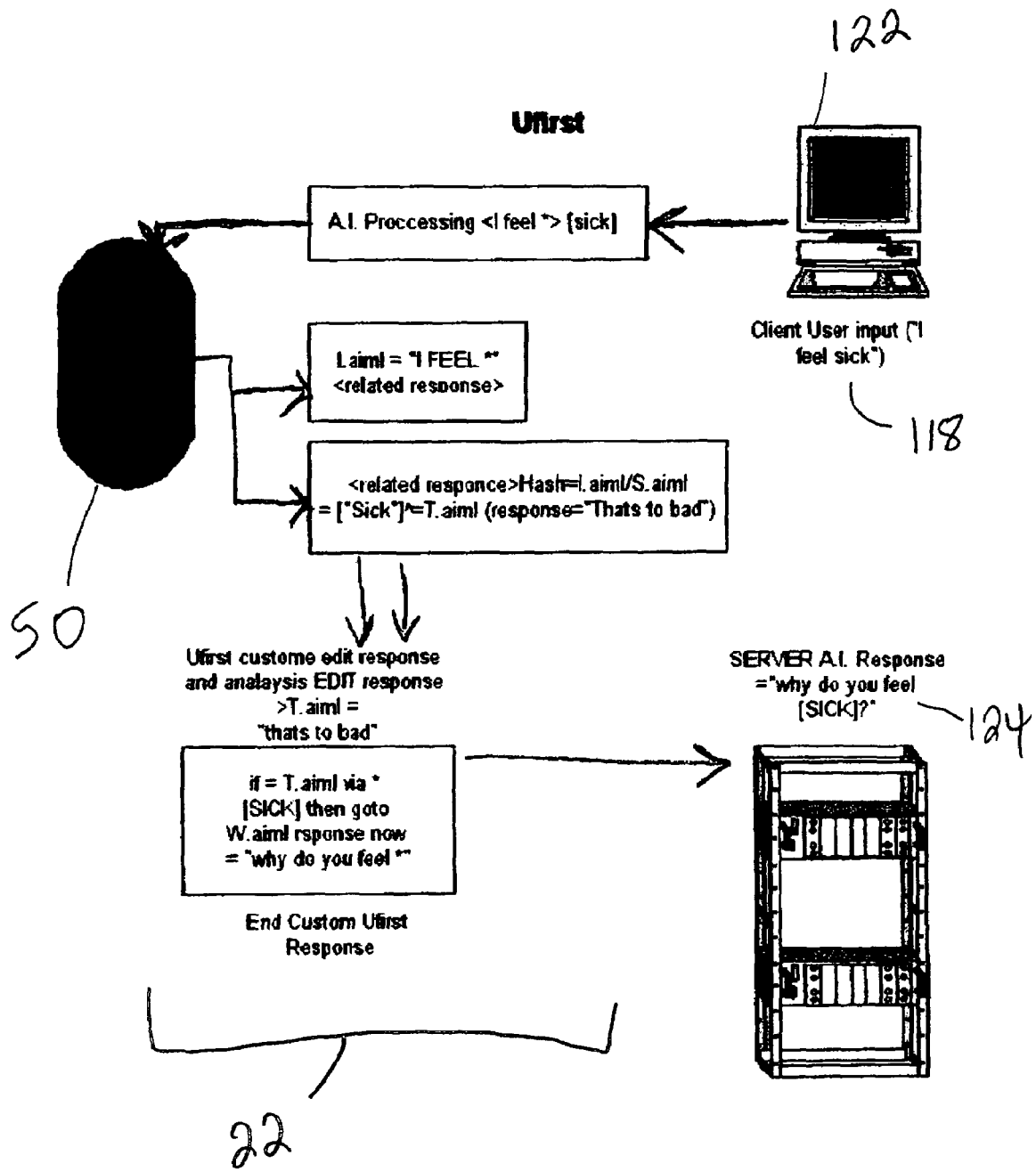
FIG. 7 is a schematic view of the process used by the A.I. bot of the present invention in answering queries from a patient.

While this simple AIML based AI application would have the ability to realistically simulate a conversation with an individual, it does not actually perform any psychological analysis since it does not repeatedly query the user in order to find out why the user feels they way he or she does. The present invention, on the other hand, does perform repeated queries in order to perform psychological analysis. As seen in FIG. 7, the AI bot of the present invention receives a message 118 from a patient 122, in this case "I feel sick". The AI bot of the present invention parses message 118 into an emotion portion "I feel" and a keyword portion "sick". The keyword contained in the initial message from patient 122 is stored in a temporary keyword list, and the AI bot of the present invention searches AIML database 50 to find the response "that's too bad". However, the AI bot of the present invention has a custom edit of the response "that's too bad". The AI bot of the present invention matches the standard response "that's too bad" with the keyword "sick" contained in the patient's message to generate the response 124 which is a question relating to the keyword "sick". In this case the response reads "why do you feel sick". Hence, the AI bot of the present invention edits the response "that's to bad" and converts it into a question "why do you feel sick", thereby prompting another message from client 122. The process repeats itself with the client's next response, which the AI bot of the present invention again parses into an emotion portion and a keyword portion. The keyword contained in the keyword portion of the second message is then added to the temporary keyword list. The keywords in the temporary list are compared to the list of keywords in database 50. If the temporary keyword list contains a "special" keyword, or a particular pattern of keywords, or a word phrase which is contained in database 50, then a special response is generated. The special response will be either a definition (usually of a keyword or psychological condition or ailment) or a pre-configured human like response. The key aspect of the AI bot of the present invention is that it generates a series of questions to build a temporary list of keywords, which can be used to identify a special response, the special response relating to some psychological condition, ailment or factor. Since the messages created by the patient generates the specific keywords contained in the temporary keyword list, the response generated by the AI bot of the present invention will very likely be responsive to the patients condition.

Figure 8:
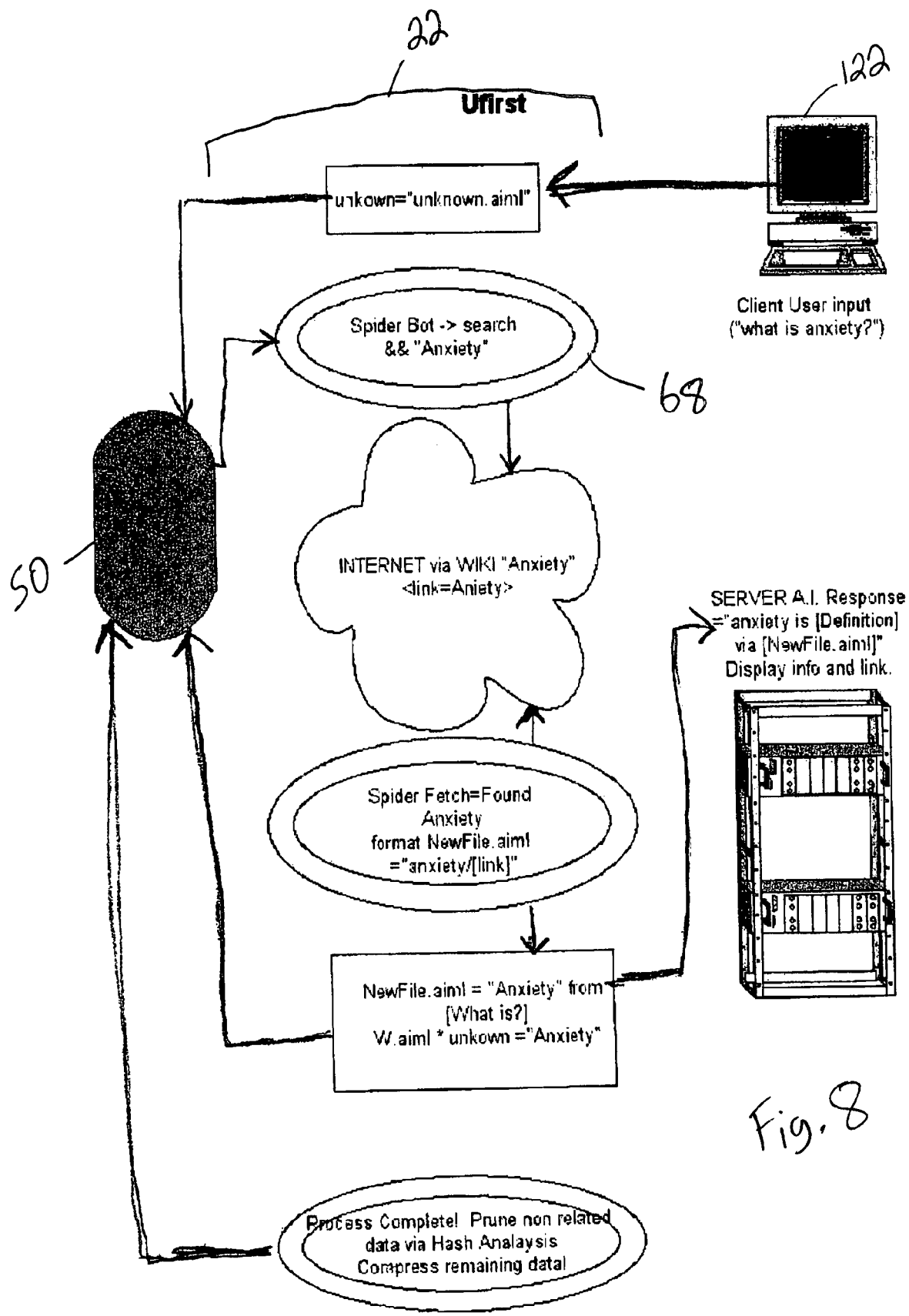
FIG. 8 is a schematic view of the process used by the A.I. and spider bots of the present invention in expanding the A.I. database used by the A.I. bot.

Referring now to FIG. 8, it is anticipated that patients will often include keywords which will not be contained in database 50 and hence will not be recognized by AI bot 22. To overcome this problem, the A.I. bot of the present invention is further advanced with the ability, via a second bot (or spider bot) to scour the internet for information relating to keywords which are not "defined" (i.e. present in database 50). In the example illustrated by FIG. 8, the patient (122) asks the question "what is anxiety", the key word "anxiety" not having a match in database 50. When AI bot 22 identifies a keyword which is not defined in database 50, it activates spider bot 68 by passing the undefined keyword to the spider bot. Spider bot 68 then opens a TCPIP connection and searches the internet, via various search engines or the like, to find web pages which contain the undefined keyword "anxiety". In the case illustrated, the spider bot finds a WIKI web page which contains the word "anxiety". The spider bot then formats the contents of the web page to lift out sentences containing the undefined keyword "anxiety" and sentences adjacent thereto, including any clickable references. The spider bot then formats the sentences lifted out of the webpages and formats them into AIML compatible files, which includes any clickable references, and adds those files to the database 50, thereby adding to the effective vocabulary of AI bot 22. When the user then asks a specific question, which the A.I. bot 22 may not have had the answer to before (i.e. was not previously contained in database 50), the A.I. bot can reply with relevant answers which may even contain a clickable reference.

Figure 5:
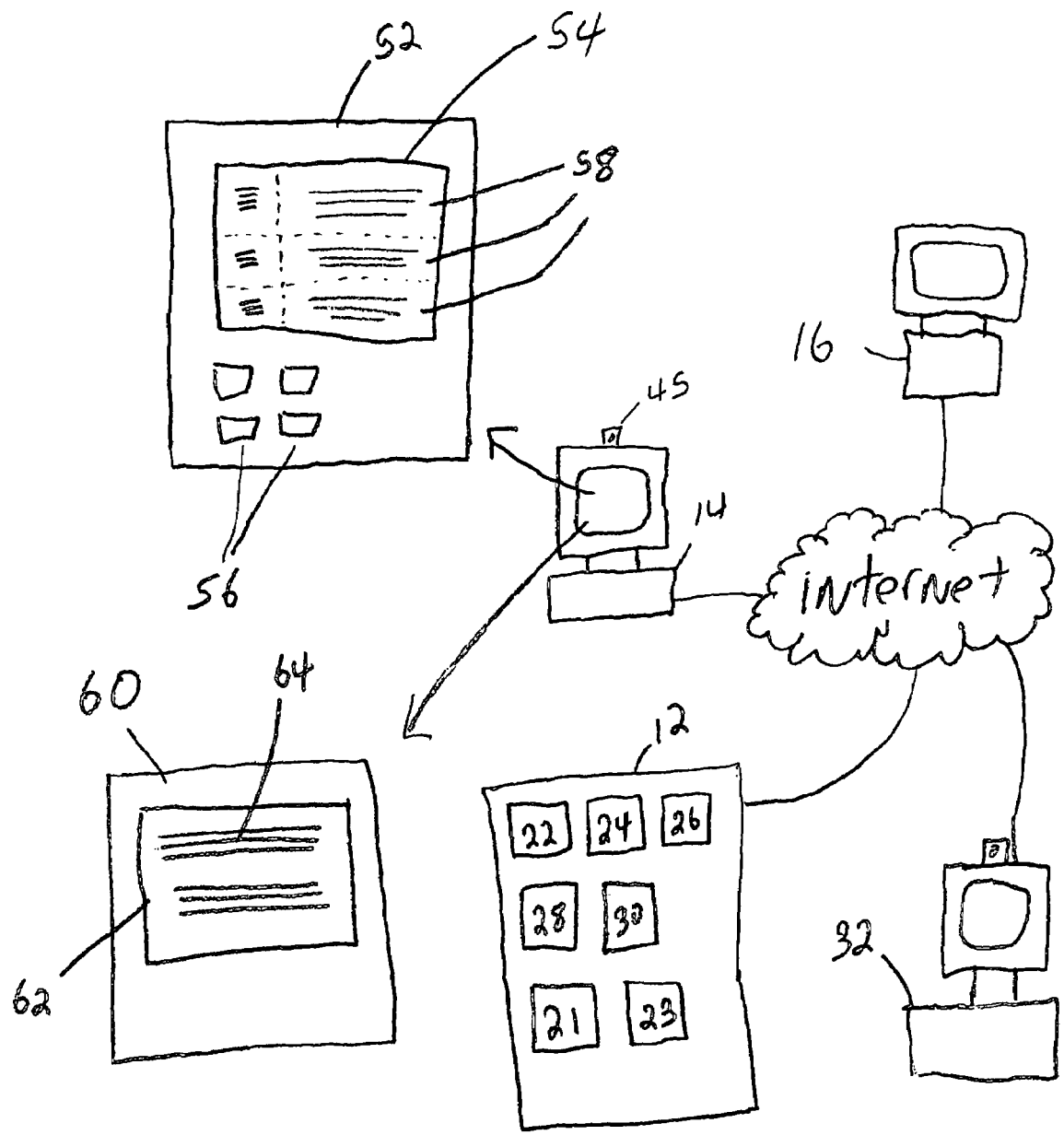
FIG. 5 is a schematic view of a patient conducting a search through the forum and wiki database features of the system of the present invention.

Referring now to FIG. 5, the patient using remote computing device 14 has the option of activating form application 28. Form application 28 is part of web site 23 and consists of a series of entries and postings on a variety of topics left by therapists and other patients. When the patient operating remote computing device 14 activates the forum, a web page 52 opens on the patients computer screen. Web page 52 has viewing window 54 wherein various topics 58 are displayed. By clicking any of the topics, the patient will be brought to another web page (not shown) wherein any posts relating to that topic are displayed. The patient may simply scroll down the list of posts in order to read the desired posts. The web page will be provided with activation links (or buttons) 56 which can be activated by the patient and which are adapted and configured to navigate the patient to another portion of the web site wherein the patient can leave a post. Several suitable forum applications can be used in the construction of forum application 28. For example, the forum applications used to drive the forums in such popular web sites such as MySpace.com or the like may be used. Various open source forum applications are available for the Linux environment from such sources as www.vabbforum.com or www.phpbb.com. The forum of the present system is restricted to topics dealing with mental health, stress, psychology and therapy and would be monitored and administered with the oversight of a trained psychologist, psychiatrist of therapist. The forum feature of the present system facilitates the advice of professionals, along with like-minded individuals that may be seeking a similar solution, who can post and receive messages. Again, this provides the system with a more welcoming "feel" which encourages the patient to seek out information which may assist in his/her treatment. This feature, and the welcoming "feel" it facilitates also assists the patient in disclosing more information when a session occurs through the system.

The system also includes a Wikipedia™ like searchable Wiki application 26 (an encyclopedia database application) which contains information relating to mental health, stress, psychology and therapy. The Wiki or encyclopedia database application has two search functions that can be found in the main portal or web page 34 (see FIG. 2), and it is also integrated into the community forum, so that the patient can search for what he/she wants, instead of wading through endless irrelevant documentation or posts. Because of this, the Wiki application is a great addition to the whole system to organize specific titles and articles, which deal with topics that the patient can easily obtain.

The system of the present invention further includes payment application 24 which permits patients to pay for therapy sessions and for practitioners and therapists to get paid for conducting these sessions. Preferably, the present payment application uses a popular payment solution such as PayPal™ or the like, thereby providing a pay for use service to parts of the community forum, so that professionals are paid for their time dispensing advice.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A system for remotely conducting psychotherapy between a client having and a therapist comprising:
   a first web enabled computer device operated by the client, said first computer device having a web browser and being operatively coupled to the Internet;
   a second web enabled computer device operated by the therapist, said first computer device having a web browser and being operatively coupled to the Internet;
   a server operatively coupled to the Internet;
   a web server application resident on the server and a web site resident on the server, said web server application being operatively coupled to a private web based chat application, said chat application being activated by the client by engaging a first link on the web site, the private chat application being adapted and configured to relay live text, audio and video messages between the client and therapist via the web browsers of the first and second computer devices;
   the web server application and the private chat applications being adapted and configured to permit the client to interact anonymously with the therapist via the chat application;
   an artificially intelligent therapy application operatively coupled to the chat application, the artificially intelligent application being adapted and configured to receive and interpret text messages from the client sent via the chat application and then formulate an appropriate response thereto, the artificially intelligent application being further adapted and configured to transmit the response to the client via the chat application;
   a forum application operatively coupled to the web site, said forum application being adapted and configured to permit a plurality of patients and therapists to view and post questions, answers and information relating to a variety of topics relating to psychotherapy, said forum application being accessible by the patient by means of a second link located on the web site, and
   an encyclopedia database application operatively coupled to the website and accessible from the web site by a third link on the website, the encyclopedia database being adapted and configured to display detailed information relating to a variety of topics relating to psychotherapy on the client's browser window, the encyclopedia database having a search application adapted and configured to permit the patient to search for specific information by entering a search term in the search application, the encyclopedia database being further adapted and configured to search for and display in the patient's browser information corresponding to the search term.

2. A system for remotely conducting psychotherapy between a client having and a therapist comprising:
- a first web enabled computer device operated by the client, said first computer device having a web browser and being operatively coupled to the Internet;
- a second web enabled computer device operated by the therapist, said first computer device having a web browser and being operatively coupled to the Internet;
- a server operatively coupled to the Internet;
- a web server application resident on the server and a web site resident on the server, said web server application being operatively coupled to a private web based chat application, said chat application being activated by the client by engaging a first link on the web site, the private chat application being adapted and configured to relay live text, audio and video messages between the client and therapist via the web browsers of the first and second computer devices;
- the web server application and the private chat applications being adapted and configured to permit the client to interact anonymously with the therapist via the chat application;
- an artificially intelligent therapy application operatively coupled to the chat application, the artificially intelligent application being adapted and configured to receive and interpret text messages from the client sent via the chat application and then formulate an appropriate response thereto, the artificially intelligent application being further adapted and configured to transmit the response to the client via the chat application; and
- wherein the artificially intelligent application is an AIML based AI bot which is adapted and configured to parse the text messages received from the client into an emotion component and a keyword component and then to store the keyword component in a temporary keyword list, the A.I. bot being further adapted and configured to search an AIML database of AIML files for a AIML file containing an appropriate response and to edit the response into a question and to wait for and receive an answer to said question, the A.I. bot being further adapted and configured to parse the answer into an additional emotion component and an additional keyword component and to then store the additional keyword component into the temporary keyword list.

3. The system of claim 2 wherein the AIML database contains a special AIML file relating to a special keyword, said special AIML file having a special response, and wherein the A.I. bot is further adapted and configured to compare the keywords in the temporary keyword list to find the special AIML file in the event the special keyword is contained in the temporary keyword list and to forward the special response in the special AIML file to the client.

4. The system of claim 3 wherein the special keyword consists of a pattern of words.

5. The system of claim 2 further comprising a spider bot operatively coupled to the A.I. bot, the A.I. bot being further adapted and configured to compare the keywords in the keyword list to the AIML files in the AIML database and to identify an undefined keyword in the temporary keyword list which does not relate to any AIML file in the AIML database, the A.I. bot being further adapted and configured to forward the undefined keyword bot to the spider bot, the spider bot being adapted and configured to search the Internet for webpages containing the undefined keyword, the spider bot being further adapted and configured to extract sentences in the webpage which contain the undefined keyword, the spider bot being further adapted and configured to format the sentences into a new AIML file containing the undefined keyword and the sentences and to add the new AIML file to the AIML database.

* * * * *